N. K. BOWMAN.
TROLLEY FROG.
APPLICATION FILED AUG. 10, 1916. RENEWED MAR. 20, 1919.
1,318,476.
Patented Oct. 14, 1919.
2 SHEETS—SHEET 2.
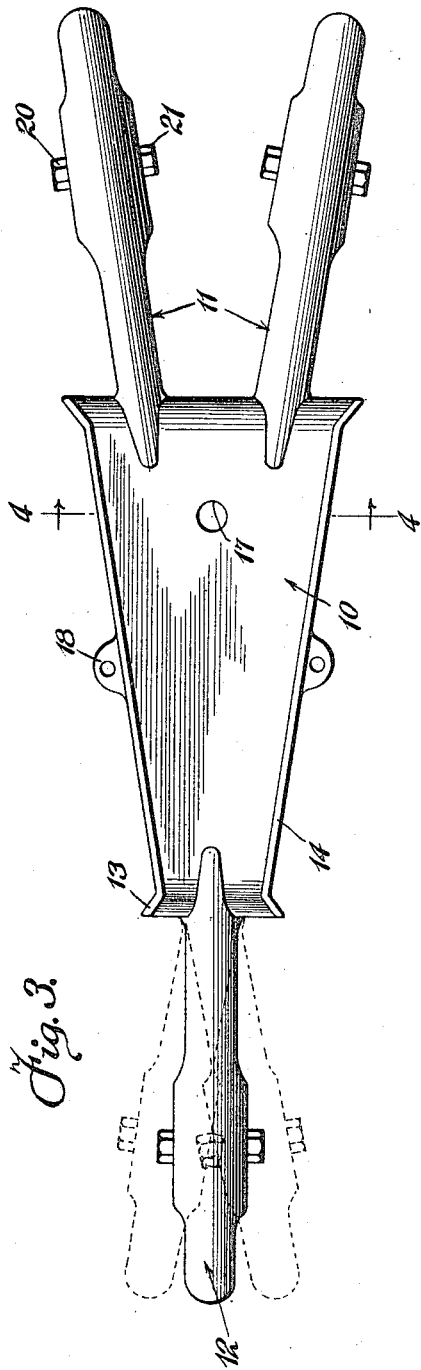
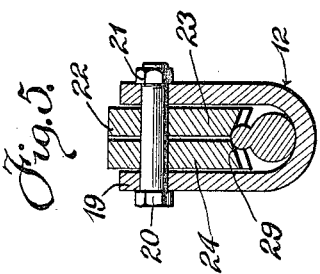
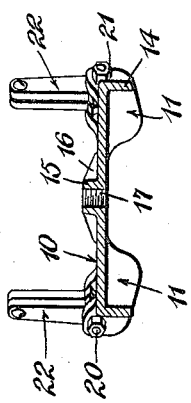
Inventor
N. K. Bowman.
By
Attorneys.

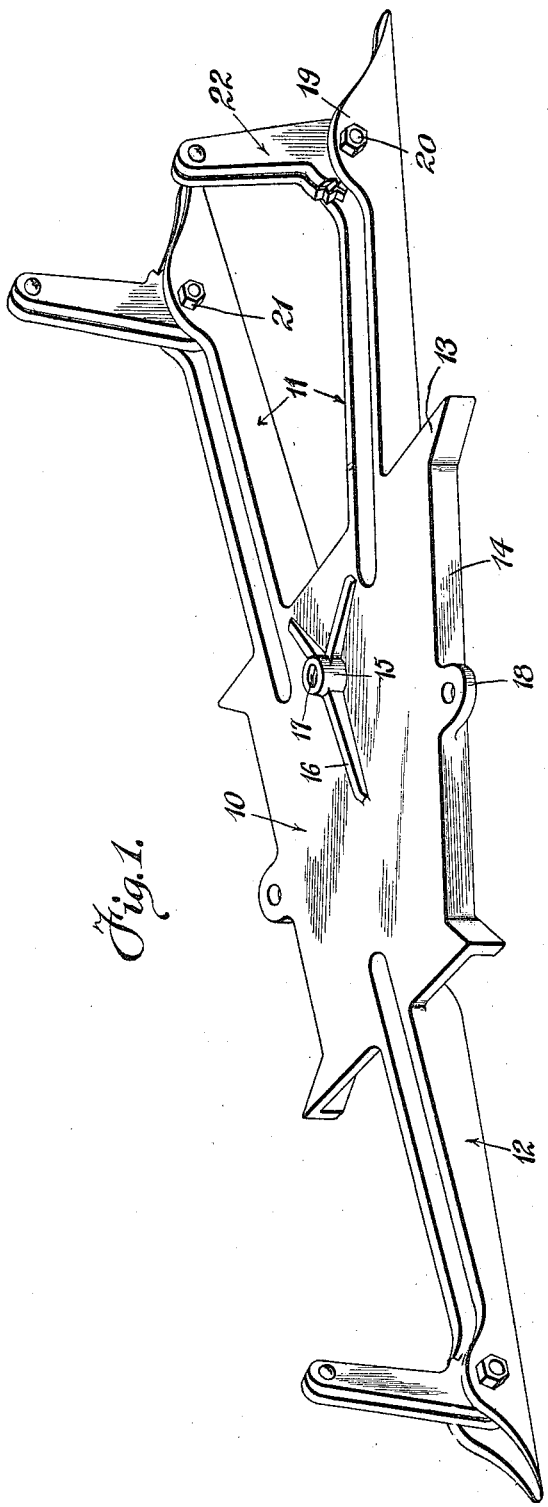
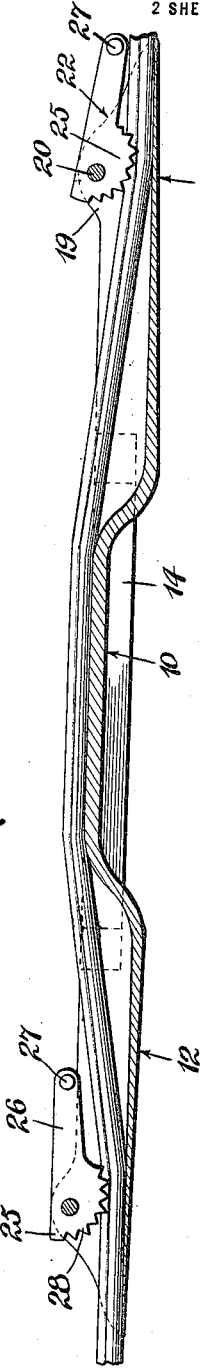

UNITED STATES PATENT OFFICE.

NEWTON K. BOWMAN, OF CANTON, OHIO, ASSIGNOR TO THE AMERICAN MINE DOOR COMPANY, A CORPORATION OF OHIO.

TROLLEY-FROG.

1,318,476.  Specification of Letters Patent.  Patented Oct. 14, 1919.

Application filed August 10, 1916, Serial No. 114,261. Renewed March 20, 1919. Serial No. 283,896.

*To all whom it may concern:*

Be it known that I, NEWTON K. BOWMAN, a citizen of the United States, residing at Canton, in the county of Stark and State of Ohio, have invented certain new and useful Improvements in Trolley-Frogs, of which the following is a specification.

My invention relates to new and useful improvements in frogs for trolley wires, the primary object of my invention being the provision of an improved form of frog which can be installed without disturbing the current, no cutting of the main trolley wire being necessary, and no bending or distortion of the main wire being caused so that it is particularly adapted for temporary use as it may be readily and quickly applied to the main wire and afterward removed without interfering with the main line in any manner whatsoever.

Another advantage which I have in view is the provision of a trolley frog of the above character which may be adjusted upon the main trolley wire by sliding it to the desired position and which may then be clamped upon the wire in such a manner that even strain of the branch trolley wire cannot possibly move it out of adjusted position.

Another object which I have in view is the provision of a trolley frog which is of sufficient weight to afford the necessary rigidity and which is so formed that the trolley wheel passes over it smoothly and without bounding.

A further object which I accomplish by my present construction is the provision of a trolley frog which may be utilized either for a right hand or left hand switch, as desired.

With these and other objects in view, my invention will be more fully described, illustrated in the accompanying drawings, and then specifically pointed out in the claims which are attached to and form a part of this application.

In the drawings:

Figure 1 is a perspective view of my improved frog looking at it from the upper side;

Fig. 2 is a fragmentary sectional view taken longitudinally of the main wire receiving sleeves;

Fig. 3 is a bottom plan view of the frog as it is manufactured, the dotted lines indicating the manner in which one of the tines or wire receiving sleeves may be later bent to adapt the frog for either a right hand or left hand switch, as desired;

Fig. 4 is a transverse sectional view taken on the line 4—4 of Fig. 3, looking in the direction of the arrows;

Fig. 5 is a section taken through one of the trolley wire receiving sleeves and the clamp for securing the wire in the sleeve.

Corresponding and like parts are referred to in the following description and indicated in all the views of the drawings by the same reference characters.

Broadly speaking, my improved trolley wire frog includes a body 10 provided at one end with diverging tines or sleeves 11 and at its opposite end with a single tine or sleeve 12. The body 10 of the frog has a plane surfaced under face and is wider at that end having the two tines, its side edges converging uniformly from such end to the opposite end. The body at its ends is flared somewhat, as shown at 13 and its side edges are formed with downwardly directed guide flanges 14 which also extend along the edges of the flared portions 13 to form in effect V-shaped guide-ways at either end of the body of the frog. Adjacent its wider edge and centrally of its width the body is formed upon its upper face with a boss 15 having a plurality of radially extending reinforcing ribs 16, one preferably extending directly toward the opposite end of the body and the others diverging toward the adjacent ends of the tines or sleeves 11. This boss, as well as the body, is provided with an internally threaded bore 17 to receive the stud of a trolley wire hanger in order that the frog may be properly supported. Substantially midway of the length of the frog and at either side, I provide apertured ears 18 which project laterally to receive guy wires, if they are necessary.

The tines or sleeves 11 are designed to receive sections of trolley wire, being U-shaped in cross section, open along their top and externally reduced along their bottom near their free ends to provide, in connection with wires clamped in them as smooth and continuous a bearing surface for the trolley wheel as possible. The upper edges of these sleeves lie substantially in the plane of the upper face of the body 10 and the lower or outer faces of the sleeves are disposed at a level below the lower face of the body, as clearly shown in Fig. 2, the difference in level between the lower face of the body and the lower faces of the sleeves being substantially equal to the depth of the trolley wire receiving groove of the trolley wheel so that the wheel may pass smoothly from the sleeve to the body of the frog. As best shown in Fig. 3 of the drawings, the inner ends of these tines or sleeves merge into the end portions of the body 10. When manufactured, the tines 11 diverge from each other symmetrically with respect to the longitudinal axis of the body 10, while the tine 12 extends from the body in an axial direction. Each of the sleeves, adjacent its free end, is formed at its sides with upstanding ears 19 to receive pivot bolts 20 having clamping nuts 21 and clamping dogs, indicated as a whole by the numeral 22, are mounted upon these pivot bolts to anchor sections of trolley wire extending through the sleeves. These clamping dogs are identical in construction and a description of one will suffice for all. Each dog is formed in two sections 23 and 24 having cam heads 25 formed with eccentrically disposed openings to receive the pivot bolts 20 and with shanks 26 which may be secured by a rivet 27 or which may be welded together, or both, as preferred. These sections have their peripheral cam faces provided with V-shaped teeth 28 in alinement with each other and the inner faces of the cam heads are beveled in such a manner that the resultant cam face is provided with a peripherally extending V-shaped notch 29 to partially embrace the trolley wire section which it engages. These sections will, of course, spread somewhat when forced into engagement with the wire and will, therefore, bind upon their pivot bolt and be held against lateral movement. At this point it should be noted that these clamping dogs may be readily removed by removing the pivot bolts 20.

When one of my improved frogs is to be used, its tine or sleeve 12 is sprung to the right or left, as shown in dotted lines in Fig. 3, according to whether the frog is to be employed as a right hand switch or a left hand switch, the bending being such as to bring it in alinement with one or the other of the tines 11. Obviously, after the frog has been used as a right hand switch, it may be later employed as a left hand switch by bending the tine 12 to the other extreme position. After this tine 12 has been properly bent, the pivot bolts 20 of the tine 12 and the alined tine 11, together with their clamping dogs, are removed and the frog is applied to the main trolley wire in such a manner as to seat this trolley wire in the sleeves from which the dogs have been removed. The dogs are then secured in the sleeves by the pivot bolts and their nuts and while the dogs are still loose the entire frog is moved or slid along the main trolley wire until it has been brought to the proper point, when the frogs are swung to lowered position, as shown in Fig. 2, to firmly clamp the frog to the main trolley wire. It will, therefore, be seen that no cutting of the main trolley wire or bending of the wire to such an extent as would interfere with its use, after removal of the frog, is necessitated, the wire being merely sprung slightly out of alinement where it passes over the upper face of the body of the frog. The end of the branch trolley wire is then inserted in the other sleeve 11 by slipping it beneath the loosened dog 22 of such sleeve and is then clamped in place by swinging the dog to lowered position. It should be noted that the dog for securing the branch trolley wire is so disposed that any strain exerted upon the branch wire will tend to swing it into more close locking engagement with the wire and therefore prevent any possibility of release of the wire during use. It will also be noted that the clamping dogs which engage the main trolley wire are both set in a manner reverse to the dog engaging the branch trolley wire in order that they may resist the strain exerted upon the frog by the weight of the branch trolley wire and so securely hold the frog against slipping along the main wire.

Attention should also be paid to the fact that the tines or sleeves of the frog are bent upwardly somewhat from the plane of the body member in order that the trolley wheel, when it is carried over the body of the frog, will be deflected downwardly as soon as it strikes the end of the sleeve, any bounding of the trolley wheel being thereby prevented. This is clearly shown in Fig. 2 of the drawings and is an important feature for the further reason that the portion of trolley wire resting upon the upper face of the body of the frog need not be sprung as much out of alinement with the remaining portion of the wire as would otherwise be necessary.

As a trolley wheel passes along any one of the tines or trolley wire receiving sleeves, the body of the frog is deflected downwardly somewhat and, due to the fact that the lower face of the sleeve is at a level below that of the lower face of the body, the periphery of the trolley wheel will smoothly engage the lower face of the body of the frog, while the periphery of the groove of the trolley wheel is still in engagement with the sleeve, there being no jumping during passage of the wheel from the sleeve to the body of the frog. The side flanges 14, of course form guides to direct the trolley wheel during its passage along the body of the frog and also stiffen and reinforce the frog.

It will of course be understood that these frogs may be made of any suitable metal and of any desired size and weight. In fact I reserve the right to make any changes, within the scope of the appended claims, which may be found necessary.

Having thus described the invention, what is claimed as new is:

1. A trolley wire frog including a body tapering from one end to the other and provided along its side edges with depending flanges, a pair of trolley wire receiving sleeves extending from one end of the body and diverging from each other symmetrically with respect to the longitudinal axis of the body, and a further trolley wire receiving sleeve extending from the opposite end of the body and in line with the axis thereof, the sleeves and body being integral and said latter sleeve being capable of being bent from one side to the other to extend in alinement with either of the first mentioned sleeves.

2. A trolley wire frog including a body tapering from one end to the other and provided along its side edges with depending flanges, a pair of trolley wire receiving sleeves integral with and extending divergently from one end of the body and open along their upper portions, a further trolley wire receiving sleeve extending from the opposite end of the body open along its upper edge and capable of being bent to extend in alinement with either of the first mentioned sleeves whereby the frog may be applied to a continuous main trolley wire with the wire extending across the upper face of the body and seating in a pair of alined sleeves and whereby a branch wire may be seated in the other sleeve, and wire clamping devices detachably mounted upon the sleeves to clamp the wires in place.

3. A trolley wire frog including a body tapering from one end to the other and provided along its side edges with depending flanges, a pair of trolley wire receiving sleeves extending divergently from one end of the body and open along their upper portions, a further trolley wire receiving sleeve extending from the opposite end of the body and open along its upper edge whereby the frog may be applied to a continuous main trolley wire with the wire extending across the upper face of the body and seating in a pair of alined sleeves and whereby a branch wire may be seated in the other sleeve, and wire clamping devices detachably mounted upon the sleeves to clamp the wires in place, that clamp upon the branch wire receiving sleeve being arranged to be tightened through stress exerted upon the wire which it clamps and those clamps upon the main wire receiving sleeve being both arranged to be tightened through stress exerted upon the frog by the branch wire.

4. A trolley wire frog including a body, a pair of diverging wire receiving sleeves extending from one end of the body, and an additional wire receiving sleeve extending from the opposite end of the body and capable of being bent from one side to the other to extend in alinement with either of the first mentioned sleeves, the sleeves and body being integral.

5. A trolley wire frog including a body, a pair of diverging wire receiving sleeves extending from one end of the body, an additional wire receiving sleeve extending from the opposite end of the body and capable of being bent from one side to the other to extend in alinement with either of the first mentioned sleeves, and wire engaging clamps coöperating with the sleeves, the clamps of those sleeves in alinement with each other being arranged to be tightened through stress exerted upon a wire held by them in one direction and the clamp of the remaining sleeve being arranged to be tightened through stress exerted upon a wire held in it in substantially the opposite direction.

6. A trolley wire frog including a body, a pair of trolley wire receiving sleeves extending divergently from one end of the body, a trolley wire receiving sleeve extending from the opposite end of the body, wire clamping devices mounted one in each of the first sleeves and each adapted to be tightened through stress exerted upon it by the wire which it clamps, one clamping device being arranged to be tightened through stress exerted upon the wire in one direction and the other through stress exerted upon the wire in substantially the opposite direction, and a clamping device in the sleeve extending singly from one end of the body.

In testimony whereof I affix my signature.

NEWTON K. BOWMAN. [L. S.]

Copies of this patent may be obtained for five cents each, by addressing the "Commissioner of Patents, Washington, D. C."